Sept. 23, 1969     W. BLINDER     3,468,034

ROUNDNESS GAUGE

Filed Sept. 28, 1966     2 Sheets-Sheet 1

INVENTOR.
William Blinder

J. J. Hodsle
ATTORNEY

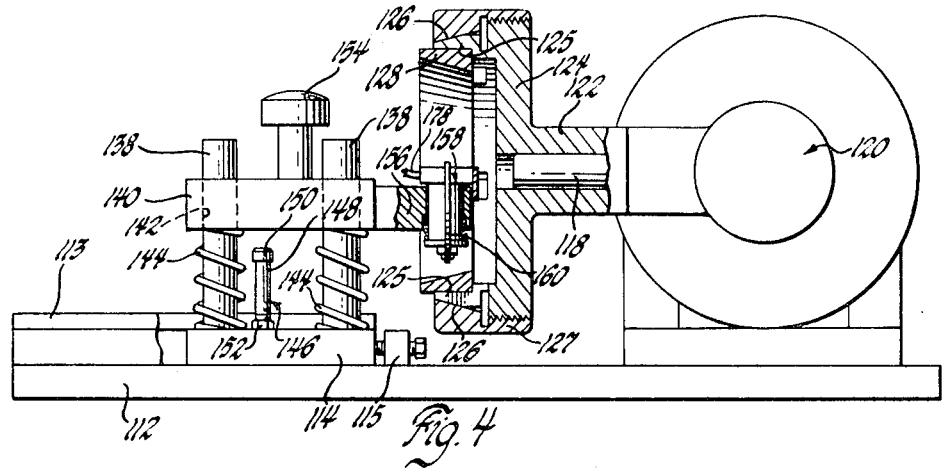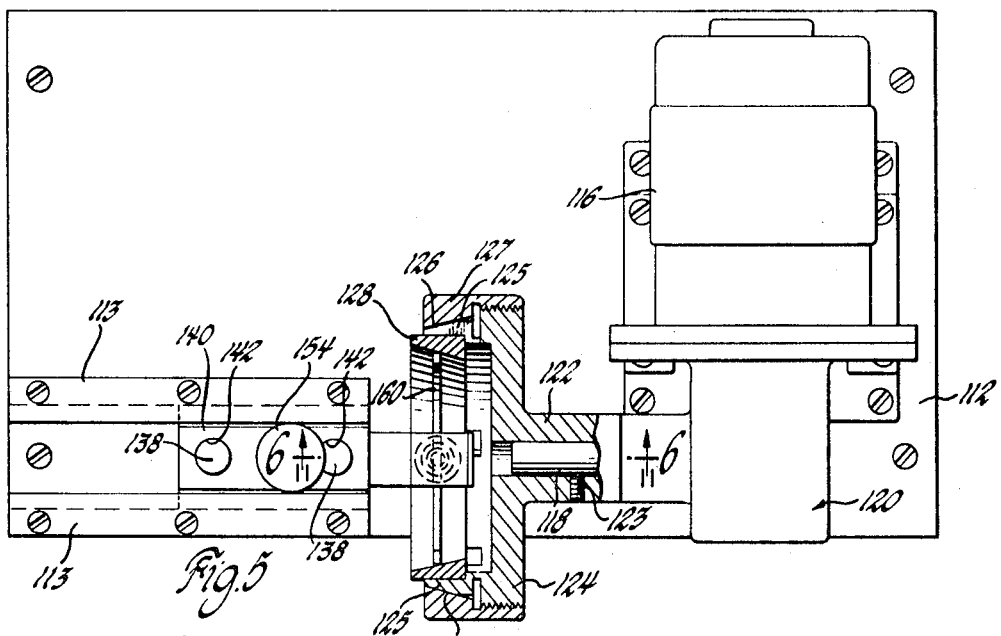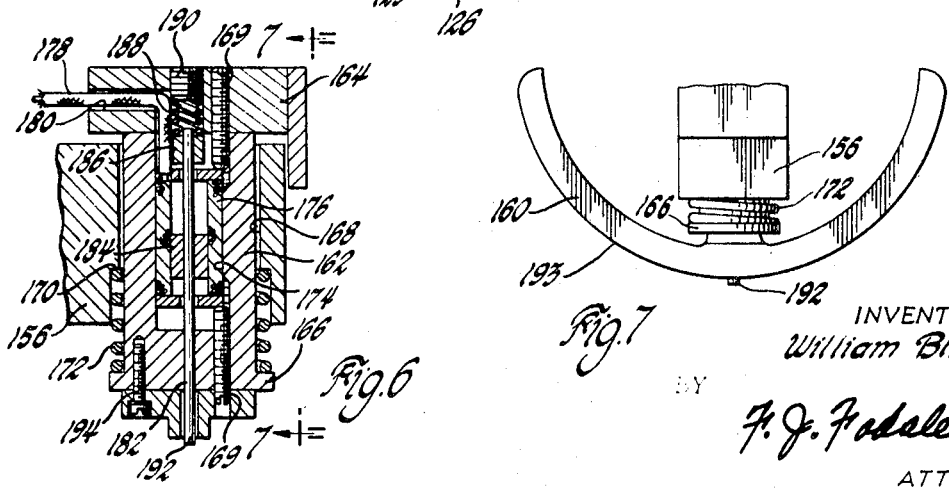

United States Patent Office 3,468,034
Patented Sept. 23, 1969

3,468,034
ROUNDNESS GAUGE
William Blinder, Newington, Conn., assignor to General Motors Corporation, Detroit, Mich., a corporation of Delaware
Filed Sept. 28, 1966, Ser. No. 582,568
Int. Cl. G01b 5/24
U.S. Cl. 33—174                                     6 Claims

ABSTRACT OF THE DISCLOSURE

A roundness gauge uses a semi-circular shoe which rides on the test part. The shoe has a diameter equal to one tolerance limit of the test part and is sufficiently resilient to accommodate a test part having a diameter at the other tolerance limit. Roundness is indicated by measuring the deviation of the test part from the shoe.

---

My invention relates generally to roundness gauges and more particularly to a gauge which measures deviations from a "best fit" reference as an indication of roundness.

The measurement of roundness of a part is complicated by eccentricity of the part being measured with respect to the gauge measuring the part; size variations within tolerances of the part and the number of circumferentially spaced lobes present on the part.

There are presently available three general mechanical or electromechanical types of gauges for measuring roundness, all of which generally operate on the principle of rotating a part with a probe or stylus contacting the part to measure the deviation of the probe from a fixed reference. None of these presently available gauges are suitable for use on a factory floor to selectively monitor the parts being produced. A suitable type gauge must be relatively inexpensive. It must be capable of monitoring the part quickly and with substantial accuracy. Inherent in this last-mentioned requirement is that the gauge must not require elaborate and time consuming set-up or centering of the part on the gauge. The gauge must also be capable of accommodating the manufacturing tolerance of the part. Lobes are formed on the part by areas of greater radius separated by areas of lesser radius. Since the defect does not occur in a predictable way, the gauge accuracy cannot be sensitive to the number of lobes on the part. The four presently available types of gauges have one or more shortcomings. The distinctive quality of each type is set forth along with a major disadvantage which is illustrative but by no means comprehensive.

The first general type is a single point gauge in which the deviation of the circumference of the part from a single fixed reference point is measured. This gauge is generally not useful for precision work since the work is rotated on a spindle and the runout and eccentricity of the spindle shows up in the measurement.

The second general type is a two-point gauge in which multiple measurements of the diameter of the part are made at different locations around the circumference of the part and the differences between maximum and minimum measurements is taken as an indication of out-of-roundness. This measurement is not sensitive to parts having an odd number of lobes and is, therefore, unsatisfactory.

In the third or three-point type, the work is rotated and the measurement is made relative to two fixed points as, for example, a V-block. This gauge is generally not accurate unless the angle of the V is optimized for a given number of lobes in the part being measured. Since the number of lobes may vary from part to part, the gauge is unsatisfactory for precision measurements.

The fourth type is similar to the first except that the spindle runout is held within a few millionths of an inch and provisions are made to locate either the work or the spindle so that the axis of the pickups and the geometrical axis of the work are coincident. This type of equipment is best illustrated by the G. M. Research "Roundicator" or the Taylor Hobson Ltd. "Talyrond." This type of equipment does provide accurate measurements but is expensive and essentially laboratory type equipment. Elaborate and time-consuming setup is required which precludes its use on a production floor.

My invention is directed toward providing a roundness gauge suitable for use on a production floor, which is to say that the gauge is relatively inexpensive, accurate and capable of speedily monitoring parts coming off a machine. A shortcoming of my gauge, however, is that it is not sensitive to two-point out of roundness. Such a part is characterized by two diametrically opposed lobes so that the part is elliptical in shape. This type of out-of-roundness is easily and commonly measured by means of two-point gauges such as micrometers or caliper-type gauges.

In its broadest aspect, the object of my invention is to provide a roundness gauge capable of measuring the roundness of a part speedily and accurately irrespective of the number of lobes on the part greater than two.

Another object of my invention is to provide such a gauge in which the probe accommodates for eccentricity and runout of the part being gauged.

Another object of my invention is to provide such a gauge in which tolerance size variations are accommodated without materially affecting the accuracy of the measurement.

Still another object is to provide a roundness gauge capable of speedily and accurately measuring a part irrespective of eccentricity, runout, size variation, and the number of lobes present on its circumference greater than two.

Other objects and advantages of the invention will hereinafter become more fully apparent from the following description of the annexed drawings, which illustrate a preferred embodiment, and wherein:

FIGURE 4 is an elevation partially in cross section of a roundness gauge in accordance with my invention for measuring the internal diameter of a part.

FIGURE 5 is a plan view partially in cross section of the gauge shown in FIGURE 4.

FIGURE 6 is an enlarged view of the pickup assembly of FIGURE 4. It is taken along the line 6—6 of FIGURE 5.

FIGURE 7 is a view taken along the line 7—7 of FIGURE 6 and looking in the direction of the arrows.

Figure 1:
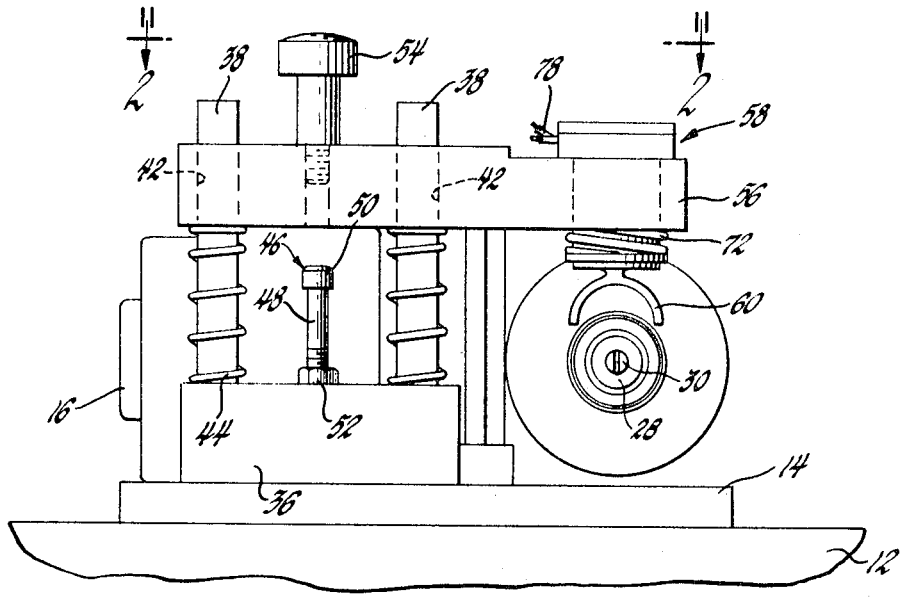
FIGURE 1 is an elevation view of a roundness gauge in accordance with my invention for measuring the outer diameter of a part.
Figure 2:
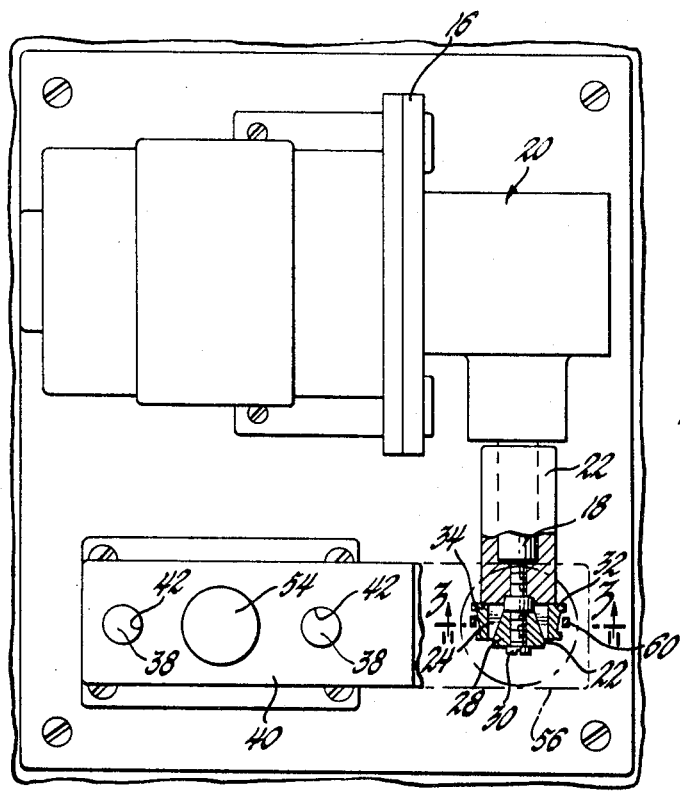
FIGURE 2 is a plan view of the gauge shown in FIGURE 1.

Referring to the drawings and more particularly to FIGURES 1 and 2, there is shown a support 12 upon which rests a bed plate 14 suitably secured to the support 12. An electric motor 16 is mounted on the aft end of the bed plate and drives a shaft 18 at right angles to the output of the motor through suitable gearing 20. Mounted on the outboard end of the shaft 18 is a mandrel 22. The mandrel 22 has an axially extending circumferential flange 24, with a tapered inner circumferential wall. The flange 24 is axially slotted to form four arcuate fingers 26. A frusto-conical plug 28 fits into the cavity formed by the flange 24. Screw 30 secures the plug 28 to the holder 22 and serves to adjust the spread of fingers 26 by the action of the plug on the tapered inner walls of the spring fingers 26. The finger spread is adjusted so that a test piece such as a tapered roller bearing inner race 32 can be quickly frictionally mounted on the end of the mandrel 22 against shoulder 34.

A stand 36 mounted on the forward end of the bed plate 14 includes a pair of spaced vertical studs 38. Cross arm 40 has a pair of spaced holes 42 which receive the studs 38 so that the cross arm 40 is slidable vertically on the studs 38. Encircling each of the studs 38 is a coil spring 44 which urges the cross arm 40 away from the stand 36. Stop 46 between the studs 38 limits the downward movement of the cross arm 40. The stop 46 comprises a threaded shaft 48 with an end cap 50 on its upper end and a nut 52 adjacent its lower end by which the exposed height of the stop 46 may be adjusted. An operation lever 54 or hold down shaft extends from the upper surface of the cross arm 40. The right-hand portion 56 of the cross arm 40 lies in a plane which is perpendicular to the axis of the shaft 18 and intersects the transverse plane of the test piece 32. A pickup assembly generally indicated at 58 is mounted on this right-hand portion 56. The pickup assembly 58 includes a resilient arcuate shoe 60 extending from the lower end of the assembly 58 which contacts the outer circumference of the test piece 32 when the cross arm 40 is depressed.

Figure 3:
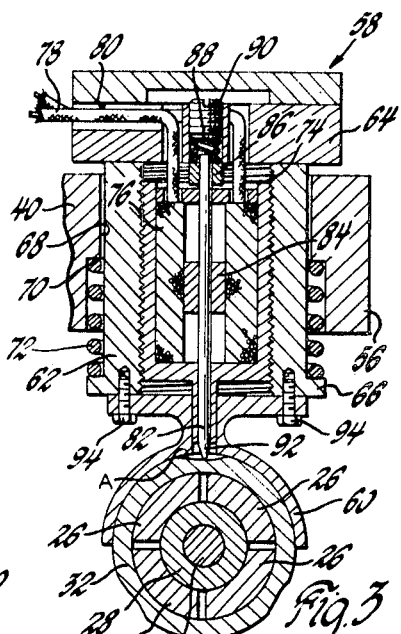
FIGURE 3 is an enlarged view of the gauge pickup assembly. It is a section taken along the line 3—3 of FIGURE 2.

Referring now to FIGURE 3, the construction details of the pickup assembly 58 are shown. The pickup assembly 58 comprises a housing 62 flanged at its upper and lower ends 64 and 66, respectively. The housing 62 is disposed in a bore 68 in the right-hand portion 56 of the cross arm 40. The lower end of the bore 68 is of larger diameter and provides an internal abutment shoulder 70. A coil spring 72 encircles the lower end of the housing and is confined between the abutment shoulder 70 and the lower flange 66 on the housing 62. The spring 72 thus urges the housing 62 downwardly or toward the test piece 32 with respect to the cross arm 40. The housing 62 has a threaded internal chamber 74 in which is mounted an encased annular coil 76. Electrical conductors 78 lead from the coil 76 out of the housing 62 through a passage 80 provided in the upper flange portion 64 of the housing 62. A plunger or stylus 82 is reciprocably disposed within the housing 62 and coil 76. The plunger 82 carrier a core 84 on its midportion and an abutment collar 86 on its upper end. A coil spring 88 is disposed in the housing 62 between the upper surface of the collar 86 and an adjustable screw stop 90. The tip or lower end 92 of the plunger protrudes into the measuring cavity defined by the inner arcuate test surface of the resilient shoe 60 which is secured to the housing 62 by bolts 94. The amount of protrusion of the plunger or stylus 82 into the test cavity is determined by the abutment collar 86 on the stylus 82. The purpose of the coil spring 88 is to lightly urge the stylus downwards to insure intimate contact with the test piece. By adjusting the screw stop 90, the amount of contact force between stylus and test piece can be predetermined. The coil 76 is threadably adjusted in the housing 62 to initially electrically balance the transformer and to provide a means for compensating for wear of the stylus 82.

In operation, the proper resilient shoe 60 is mounted on the housing 62. This shoe is approximately semi-circular or 180°. The internal diameter is the smallest diameter within tolerances of the part being tested. The shoe must be sufficiently resilient so that when lightly loaded into engagement with the part to be gauged, it will flex and expand to accommodate the largest diameter of the part within tolerances. After the shoe has been mounted, the cross arm is in the position shown in FIGURE 1. The test piece 32 is then mounted on the holder 22 and motor 16 is energized to rotate the piece. The cross arm 40 is manually depressed through lever 54 until the shoe 60 engages the test piece 32 and the pickup assembly 58 is lifted slightly from the cross arm 40. Note the shoe 60 is now resiliently biased onto the test piece 32 by coil spring 72. This resilient mounting of the pickup assembly enables it to follow the runout and eccentricity of the test piece 32. In addition, the plunger 82 is resiliently biased into the test piece 32 by coil spring 82. As the test piece 32 rotates, the plunger 82 follows the test piece surface and its displacement relative to the shoe 60 and housing 62 indicates the deviation of the surface from a "best fit" reference. The "best fit" reference surface is formed by the resilient shoe 60 which has expanded to contact two or more of the high points on the part being tested. In FIGURE 3, the test piece 32 is shown as having three lobes, greatly exaggerated for purposes of illustration. The depth of depression A in the test piece surface with respect to the best fit of the shoe 60 is indicated by the relative positions of housing 62 and plunger 82. This deviation can be indicated or traced for the entire circumference of the test piece by connecting the electrical conductors 78 to a suitable electrical device sensitive to the linear displacement transformer 76–84. Also the conductors could be connected to a go-no go type indicator to discriminate between acceptable and nonacceptable parts. While the disclosure shows an electrical type pickup, the relative displacements of the shoe 60 and plunger 82 could obviously be indicated or recorded entirely mechanically. After testing, the handle 54 is released, moving the pickup assembly 58 away from the specimen so that it may be replaced by the next piece to be tested. When different size pieces are to be tested, the shoe 60 or whole assembly 58 may be replaced with one having a shoe which will provide the proper "best fit" reference. The one drawback of my gauge mentioned in the introduction can also best be understood in reference to FIGURE 3. If the test piece is two-point out of round or oval shaped, the resilient shoe will expand and contract to fit the oval giving no indication of out of roundness.

Referring now to FIGURES 4 through 7 generally and FIGURES 4 and 5 particularly, I have shown my invention in an embodiment for measuring the internal diameter of a test piece or pad. The support 112 is provided with a track 113 in its forward right-hand corner. A truck 114 is slidable within the track 113. An adjustable stop 115 is provided at the inner end of the track 113. An electric motor 116 mounted on the right end of the truck 112 drives shaft 118 at right angles to the output of the motor through suitable gearing 120. A holder 122 is secured to the end of the shaft 118 by a set screw 123. The left end of the holder 122 has an enlarged vertical wall 124 with axially extending fingers 125 having tapered outer surfaces 126. The fingers 125 form a test receiving cavity. A ramped collar 127 is threadably secured to the vertical wall 124 and engages the outer surfaces 126 of fingers 125 so that by adjusting the collar 127 the dimension of the test cavity can be varied whereupon a test piece 128 may be placed in the cavity and frictionally held there during the test.

The truck 114 includes a pair of vertical studs 138. A cross arm 140 has a pair of spaced holes 142 which receive the studs 138 so that the cross arm 140 is slidable vertically on studs 138. Coil springs 144 encircle each of the studs 138 and urge the cross arm 140 away from the truck 114. An adjustable stop 146 is provided on the truck 114 by the studs 138. The adjustable stop 146 comprises a threaded shaft 148 having an end cap 150 on its upper end and a nut 152 adjacent its lower end by which the spindle height of the stop 146 may be adjusted. A spindle or hold down shaft 154 extends from the upper surface of the cross arm 140. When the truck is in its extreme right end position across the adjustable stop 115, the right end portion 156 of the cross arm lies in a plane which is perpendicular to the axis of the shaft 118 and intersects a transverse plane of the test piece 128. A pickup assembly generally indicated at 158 is mounted on this right-hand portion. Pickup assembly 158 includes a resilient arcuate shoe 160 extending from the lower end of the assembly 158 which contacts the inner circumference of the test piece 128 when the cross arm 140 is depressed.

Referring now to FIGURE 6, the construction details of the pickup assembly are shown. It comprises a housing 162 flanged at its upper and lower ends 164, and 166, respectively. The housing 162 is disposed in a bore 168 in the right end portion of the cross arm 140. The lower end of the bore 168 is of larger diameter and provides an internal abutment shoulder 170. A coil spring 172 encircles the lower end of the housing and is confined between the abutment shoulder 170 and the lower flange 166 on the housing 162. The spring 172 itself urges the housing 162 downwardly or toward the test piece 128 with respect to the cross arm 140. The housing 162 has an internal chamber 174 in which is disposed an annular coil 176. Electrical conductors 178 lead from the coil 176 out of the housing 162 through a passage 180 in the housing 162. Set screws 169 protrude into the cavity 174 from the upper and lower ends of the housing 162, respectively, and engage the upper and lower ends of the coil 176. Thus the coil 176 may be located vertically within the housing 162 by suitable adjustment of the set screws 169. A plunger or stylus 182 is reciprocably disposed within the housing 162 and coil 176. The plunger 182 carries a core 184 on its midportion and abutment 186 adjacent its upper end. Coil spring 188 provided between the upper surface of abutment 186 and adjustment screw stop 190 on the housing 162 urges the plunger 182 downwardly with respect to the housing 162. The tip or lower end 192 of the plunger 182 protrudes out of the outer circumferential test surface 193 of the resilient shoe 160 which is secured to the housing 162 by bolts 194. By adjusting screw stop 190, the amount of protrusion of stylus 182 past the arcuate measuring surface 193 of shoe 160 can be predetermined. Once this protrusion has been determined, the coil 176 can be adjusted in the housing 162 by set screws 169 to give it a zero output signal at a given position of plunger 182.

In operation, the proper size resilient shoe 160 is first mounted on the housing 162. For the inspection of parts having larger internal diameters, the shoe may be approximately semi-circular or 180°, however, on parts with smaller internal diameters, the shoe might be somewhat less than 180° so that the shoe may enter a smaller bore freely. The outer diameter is ground to the largest diameter of the part being tested within tolerances. The shoe 160 must be sufficiently resilient so that when it is lightly loaded into engagement with the test piece 128, it will flex and contract to accommodate the smallest diameter of the part within teolerances. Once shoe 160 has been mounted, the test piece 128 is inserted in the holder 122 and the cross arm 140 and truck 114 are moved toward the right as viewed in FIGURE 4 until the truck 114 abuts the stop 115. In this position, the stylus 182 and shoe 160 are perpendicular to the axis of the test piece 128 with the stylus 182 and shoe 160 lying in a vertical plane passing through a transverse plane of the test piece 128. The motor 116 is energized to rotate the part. Cross arm 140 is manually depressed through lever 154 until the shoe 160 contacts the test piece 128 and the pickup assembly 158 is lifted slightly from cross arm 140. See FIGURE 6. Note the shoe is now resiliently biased into engagement with the test piece 128 by coil spring 172. This resilient mounting of the pickup assembly 156 enables it to follow the runout and eccentricity of the test piece 128. The plunger 182 in turn is resiliently biased away from the housing 162 toward the test piece by the coil spring 172. The lower end 192 of the plunger 182 follows the test surface and the displacement of the plunger relative to the shoe 160 and housing 162 indicates deviation of the surface from the "best fit" reference provided by the shoe. This deviation can be indicated or traced for the entire circumference of the test piece as it rotates by connecting the electrical conductors 178 to a suitable electrical device sensitive to the linear displacer transformer 176–184. Also the conductors 178 could be connected to a go-no go type indicator to discriminate between acceptable and nonacceptable parts. While the disclosure shows an electrical type pickup, the pickup, the relative displacements of the shoe 160 and plunger 182 could obviously be indicated or recorded entirely mechanically. After testing, the handle 154 is released, moving the pickup assembly 158 and cross arm 140 upward out of engagement of the test sample 128. The cross arm 140 and truck 114 are then slid to the left out of the way of the holder 122 so that the test piece 128 may be replaced by the next piece to be tested. When different size pieces are to be tested, the shoe 160 or whole assembly 158 may be replaced with one having a shoe of the proper "best fit" reference.

Thus it can be seen that my roundness gauge which can be adapted to measure either internal or external diameters is capable of speedily and accurately measuring a part irrespective of eccentricity, runout, size variation, and the number of lobes present on the circumference of the part.

It should be understood, of course, that the foregoing disclosure relates to only preferred embodiments of the invention and that it is intended to cover all changes and modifications of the example of the invention herein chosen for the purposes of the disclosure, which do not constitute departures from the spirit and scope of the invention.

For example, while I have disclosed my gauge as a separate test unit, the cross arm and pickup assembly could obviously be mounted on a machine tool so as to measure the parts while in the tool with the machine tool itself providing the means to rotate the part.

I claim:

1. A gauge for measuring the deviation of the nominally circularly cylindrical or conical surface of a part having a tolerance acceptable between a minimum and maximum limit from a best fit reference to indicate roundness of the surface comprising, in combination:

a support,
a holder adapted to receive a part to be gauged on said support,
means to rotate said holder,
a shoe mounted on said support, said shoe having a substantially semi-circuarly cylindrical reference surface of a diameter susbtantially equal to one tolerance limit of the surface of the part to be gauged, said shoe being sufficiently resilient so that said surface accommodates a part having a diameter at the other tolerance limit,
means to bias said shoe toward said work holder,
a stylus reciprocably mounted on said shoe so as to intersect said reference surface, and
resilient means to bias said stylus into contact with said part whereby said shoe and stylus are adapted to contact the part as it is rotated with the position of said stylus with respect to said shoe measuring the deviations of said part from a best fit reference to indicate roundness of the part.

2. The gauge as defined in claim 1 wherein said shoe is resiliently mounted on said support so as to be biased into engagement with the test part whereby the shoe is adapted to follow the eccentricity and runout of the part with respect to shoe.

3. The gauge as defined in claim 1 wherein said shoe has an internal diameter equal to the smallest diameter of the part to be tested within tolerances, and said reference surface is the inner circumferential surface of said shoe.

4. The gauge as defined in claim 1 wherein said shoe has an outer diameter equal to the largest diameter of the part to be tested within tolerances, and said reference surface is the outer circumferential surface of said shoe.

5. A gauge for measuring the deviation of the nominally circularly cylindrical or conical outer surface of a part from a best fit reference to indicate roundness of the surface, comprising, in combination:

a support,
a holder adapted to receive a part to be gauged on said support,
means to rotate said holder,
an arm mounted on said support, said arm having a portion lying in a first plane which is perpendicular to the axis of rotation of said holder and passes through said holder, said arm being translatable in a second plane perpendicular to said first plane whereby said portion is translatable along a line in said first plane passing through the center of said holder,
a shoe movably mounted on said portion for translation in said first plane along said line, said shoe having an internal semi-circularly cylindrical surface of a diameter equal to the minimum diameter within tolerances of the outer surface of the part said shoe being sufficiently resilient so that said shoe surface accommodates a part having a maximum diameter within tolerances, to be gauged to form a best fit reference surface,
spring means between said arm and said shoe biasing said shoe toward said holder,
a stylus reciprocably mounted on said shoe and intersecting said reference surface, and
resilient means to urged said stylus away from said reference surface toward said holder whereby said shoe and stylus are adapted to contact a rotating part with the position of said stylus with respect to said shoe measuring the deviations of said part from a best fit to indicate roundness of the part.

6. A gauge for measuring the deviation of the nominally circularly cylindrical or conical inner surface of a part from a best fit reference to indicate roundness of the surface, comprising, in combination:

a support,
a holder adapted to receive a part to be gauged on said support,
means to rotate said holder,
an arm mounted on said support, said arm having a portion lying in a first plane which is perpendicular to the axis of rotation of said holder and passes through said holder, said arm being translatable in a second plane perpendicular to said first plane whereby said portion is translatable along a line in said first plane passing through the center of said holder,
a shoe movably mounted on said portion for translation in said first plane along said line, said shoe having an outer semi-circularly cylindrical surface of a diameter equal to the maximum diameter within tolerances of the inner surface of the part to be gauged to form a best fit reference surface,
said shoe being sufficiently resilient so that said shoe surface accommodates a part having a minimum diameter within tolerances,
spring means between said arm and said shoe biasing said shoe toward said holder,
a stylus reciprocably mounted on said shoe and intersecting said reference surface, and
resilient means to urge said stylus away from said reference surface toward said holder whereby said shoe and stylus are adapted to contact a rotating part with the position of said stylus with respect to said shoe measuring the deviations of said part from a best fit to indicate roundness of the part.

References Cited
UNITED STATES PATENTS 3,353,276  11/1967  Saimanov et al.

SAMUEL S. MATTHEWS, Primary Examiner

U.S. Cl. X.R.

33—178

PO-1050
(5/69)

UNITED STATES PATENT OFFICE
CERTIFICATE OF CORRECTION

Patent No. 3,468,034  Dated September 23, 1969

Inventor(s) William Blinder

It is certified that error appears in the above-identified patent and that said Letters Patent are hereby corrected as shown below:

Column 3, line 50, delete "carrier" and substitute -- carries --. Column 5, line 56, delete "teolerances" and substitute -- tolerances --. Column 7, line 25, after "part" insert -- to be gauged to form a best fit reference surface, --; lines 28 and 29, delete "to be gauged to form a best fit reference surface,".

SIGNED AND
SEALED
DEC 23 1969

(SEAL)
Attest:

Edward M. Fletcher, Jr.
Attesting Officer

WILLIAM E. SCHUYLER, JR.
Commissioner of Patents